(12) United States Patent
George et al.

(10) Patent No.: US 7,620,567 B2
(45) Date of Patent: Nov. 17, 2009

(54) SYSTEMS AND METHODS FOR OPERATING LOYALTY PROGRAMS

(75) Inventors: Colleen George, Centennial, CO (US); John Cawthorne, Doylestown, PA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1553 days.

(21) Appl. No.: 10/079,927

(22) Filed: Feb. 19, 2002

(65) Prior Publication Data

US 2003/0158818 A1 Aug. 21, 2003

(51) Int. Cl.
G06Q 30/00 (2006.01)

(52) U.S. Cl. .......................... 705/14; 705/64

(58) Field of Classification Search .............. 705/14, 705/26, 64
See application file for complete search history.

(56) References Cited

U.S. PATENT DOCUMENTS

| | | | |
|---|---|---|---|
| 5,117,355 A | 5/1972 | McCarthy | |
| 4,723,212 A | 2/1988 | Mindrum et al. | |
| 4,910,672 A | 3/1990 | Off et al. | |
| 4,941,090 A | 7/1990 | McCarhty | |
| 5,025,372 A | 6/1991 | Burton et al. | |
| 5,056,019 A | 10/1991 | Schultz et al. | |
| 5,173,851 A | 12/1992 | Off et al. | |
| 5,185,695 A | 2/1993 | Pruchnicki | |
| 5,200,889 A | 4/1993 | Mori | |
| 5,202,826 A | 4/1993 | McCarhty | |
| 5,305,196 A | 4/1994 | Deaton et al. | |
| 5,448,471 A | 9/1995 | Deaton et al. | |
| 5,471,669 A | 11/1995 | Kidman | |
| 5,483,444 A | 1/1996 | Heintzeman et al. | |
| 5,530,232 A | 6/1996 | Taylor | |
| 5,537,314 A | 7/1996 | Kanter | |
| 5,578,808 A | 11/1996 | Taylor | |
| 5,612,868 A | 3/1997 | Off et al. | |
| 5,642,485 A | 6/1997 | Deaton et al. | |
| 5,644,723 A | 7/1997 | Deaton et al. | |

(Continued)

FOREIGN PATENT DOCUMENTS

EP 0253240 A1 1/1988

(Continued)

OTHER PUBLICATIONS

US 6,460,019, 10/2002, Walker et al. (withdrawn)

*Primary Examiner*—Andrew J. Fischer
*Assistant Examiner*—Chrystina Zelaskiewicz
(74) *Attorney, Agent, or Firm*—Townsend and Townsend and Crew LLP (57) ABSTRACT

A loyalty system that may be integrated with a financial infrastructure is provided. Such a financial infrastructure may accommodate transactions involving participants in the loyalty program as well as transactions that do not involve participants in the loyalty program. When a transaction is initiated by a customer at a merchant, regardless of who are the parties to the transaction, it is intercepted by a loyalty switch, which determines whether the customer and merchant are participants in the loyalty program. The switch transmits the transaction instruction to the financial infrastructure so that authorization may be received. If it is determined that the customer and merchant are participants in the loyalty program, the loyalty switch also executes a loyalty process that conforms with the criteria of the loyalty program.

4 Claims, 10 Drawing Sheets

U.S. PATENT DOCUMENTS

| | | |
|---|---|---|
| 5,649,114 A | 7/1997 | Deaton et al. |
| 5,659,469 A | 8/1997 | Deaton et al. |
| 5,687,322 A | 11/1997 | Deaton et al. |
| 5,689,100 A | 11/1997 | Carrithers et al. |
| 5,734,838 A | 3/1998 | Robinson et al. |
| 5,774,870 A | 6/1998 | Storey |
| 5,804,806 A | 9/1998 | Haddad et al. |
| 5,806,045 A | 9/1998 | Biorge et al. |
| 5,832,457 A | 11/1998 | O'Brien et al. |
| RE36,116 E | 2/1999 | McCarthy |
| 5,903,880 A | 5/1999 | Biffar |
| 5,909,486 A | 6/1999 | Walker et al. |
| 5,915,007 A | 6/1999 | Klapka |
| 5,923,016 A | 7/1999 | Fredregill et al. |
| 5,924,080 A | 7/1999 | Johnson |
| 5,926,795 A | 7/1999 | Williams |
| 5,969,318 A | 10/1999 | Mackenthun |
| 5,974,399 A | 10/1999 | Giuliani et al. |
| 5,983,196 A | 11/1999 | Wendkos |
| 5,991,376 A | 11/1999 | Hennessy et al. |
| 6,000,608 A | 12/1999 | Dorf |
| 6,009,411 A | 12/1999 | Kepecs |
| 6,009,412 A | 12/1999 | Storey |
| 6,009,415 A | 12/1999 | Shurling et al. |
| 6,012,635 A | 1/2000 | Shimada et al. |
| 6,024,288 A | 2/2000 | Gottlich et al. |
| 6,026,370 A | 2/2000 | Jermyn |
| 6,032,136 A | 2/2000 | Brake, Jr. et al. |
| 6,061,860 A | 5/2000 | Eggleston et al. |
| 6,119,933 A | 9/2000 | Wong et al. |
| 6,138,911 A | 10/2000 | Fredregill et al. |
| 6,189,787 B1 | 2/2001 | Dorf |
| 6,195,644 B1 | 2/2001 | Bowie |
| 6,222,914 B1 | 4/2001 | McMullin |
| 6,229,879 B1 | 5/2001 | Walker et al. |
| 6,278,979 B1 | 8/2001 | Williams |
| 6,282,516 B1 | 8/2001 | Giuliani |
| 6,292,786 B1 | 9/2001 | Deaton et al. |
| 6,321,210 B1 | 11/2001 | O'Brein et al. |
| 6,334,108 B1 | 12/2001 | Deaton et al. |
| 6,351,735 B1 | 2/2002 | Deaton et al. |
| 6,377,935 B1 | 4/2002 | Deaton et al. |
| 6,409,080 B2 | 6/2002 | Kawagishi |
| 6,419,161 B1 | 7/2002 | Haddad et al. |
| 6,424,949 B1 | 7/2002 | Deaton et al. |
| 6,424,951 B1 | 7/2002 | Shurling et al. |
| 6,450,407 B1 | 9/2002 | Freeman et al. |
| 2001/0025879 A1 | 10/2001 | Kawagishi |
| 2001/0034720 A1 | 10/2001 | Armes |
| 2001/0054003 A1 * | 12/2001 | Chien et al. .................. 705/14 |
| 2002/0046116 A1 | 4/2002 | Hohle et al. |
| 2002/0062253 A1 | 5/2002 | Dosh, Jr. et al. |
| 2002/0065712 A1 | 5/2002 | Kawan |
| 2002/0065716 A1 | 5/2002 | Kushchill |
| 2002/0082920 A1 | 6/2002 | Austin et al. |
| 2002/0099601 A1 | 7/2002 | Farrell |
| 2002/0107797 A1 | 8/2002 | Combaluzier |
| 2002/0112236 A1 | 8/2002 | Sukeda et al. |
| 2002/0120514 A1 | 8/2002 | Hagmeier et al. |
| 2002/0123926 A1 | 9/2002 | Bushold et al. |
| 2002/0143626 A1 | 10/2002 | Voltmer et al. |
| 2003/0182247 A1 * | 9/2003 | Mobed et al. .................. 705/78 |

FOREIGN PATENT DOCUMENTS

| | | |
|---|---|---|
| EP | 0933717 A2 | 8/1999 |
| EP | 0 987 642 A2 | 3/2000 |
| EP | 1011060 A1 | 6/2000 |
| EP | 0933717 A3 | 2/2001 |
| EP | 1139252 A2 | 10/2001 |
| EP | 1232776 A2 | 8/2002 |
| GB | 2274349 A | 7/1994 |
| WO | WO 93/08546 A1 | 4/1993 |
| WO | WO 98/06050 A | 2/1998 |
| WO | WO 00/21004 A | 4/2000 |

* cited by examiner

PRIOR ART

Fig. 1A

PRIOR ART

SYSTEMS AND METHODS FOR OPERATING LOYALTY PROGRAMS

BACKGROUND OF THE INVENTION

This application relates generally to consumer transactions. More specifically, this application relates to operating loyalty programs in connection with consumer transactions.

In recent years, there has been a steady proliferation of loyalty programs offered to consumers. There are a variety of different models on which such loyalty programs are based, but a common feature of all is that they offer an incentive designed to encourage customers to conduct business preferentially with one organization rather than with competitor organizations. For example, such loyalty systems often take the form of point systems in which a customer is credited with a number of points for each transaction and is entitled to exchange certain numbers of points for goods and/or services.

A prototypical example of such a loyalty system is used in the airline industry. An airline typically offers some number of points to each consumer that is correlated with the distance traveled. At certain levels, the points may be exchanged by the consumer for airline tickets; generally, a larger number of points is required for more valuable international or intercontinental tickets. Sometimes, additional incentives may be used to induce customers to reach certain point levels, such as by providing preferential seating and booking privileges. Similar loyalty systems are also used in environments for the retail sale of goods, with customers of a particular store being entitled to rewards in exchange for certain levels of business. Generally, however, such loyalty systems are limited in flexibility and are narrow in scope.

There is a general recognition in the industry of a need for more sophisticated loyalty-based systems capable of responding to long-term competitive threats such as retail overcapacity, mass advertising spending, consumer attrition issues, etc. For example, it is desirable for the system to be sufficiently flexible that rewards can be provided quickly, even in real time at the moment the desired point level is reached. Similarly, it is desirable for the system not to be reliant on a specific type of tender, such as a specific type of loyalty-program card, but instead to be capable of accepting any type of tender, whether it be a loyalty-program card, credit card, debit card, store-specific coupon, or other instrument.

BRIEF SUMMARY OF THE INVENTION

Accordingly, embodiments of the invention provide a method for operating a loyalty system that may achieve such increased flexibility. In one embodiment, a loyalty program is integrated with a financial infrastructure, such as may provided to supply authorizations for transactions. Such a financial infrastructure is generally configured more broadly to accommodate transactions that may involve participants in the loyalty program but also transactions that do not involve participants. When a transaction is initiated by a customer at a merchant, regardless of who are the parties to the transaction, it is intercepted by a loyalty switch, which determines whether the customer and merchant are participants in the loyalty program. The switch transmits the transaction instruction to the financial infrastructure so that authorization may be received. If it is determined that the customer and merchant are participants in the loyalty program, a loyalty process is executed that conforms with the criteria of the loyalty program.

This arrangement permits the loyalty switch to monitor the criteria for multiple loyalty programs that may exist between various combinations of consumers and merchants. Whenever it encounters a transaction between parties that comes within the scope of one of the loyalty programs, the appropriate loyalty process is executed by a loyalty host. The loyalty host is configured to act as an administration authority and includes administration criteria for multiple distinct loyalty programs. Information regarding the loyalty programs, including such features as point levels and available rewards, is thus stored and administered remotely by the loyalty host rather than being integrated as a function of a loyalty device such as a smart card.

Generally, execution of the loyalty process will proceed at the same time as waiting for authorization for the transaction from the financial infrastructure. If the transaction is authorized, the authorization is transmitted back to the merchant. In some instances where the loyalty program provides the customer with an instant reward, the transmission back to the merchant may be accompanied with instructions for implementing the instant reward. If the transaction is not authorized, the loyalty process will be backed out by removing its application before returning a transmission to the merchant.

This arrangement is especially suitable where a point-of-sale terminal is used to process the transaction. The point-of-sale terminal may be configured to recognize a variety of instruments that may be used by the customer to effect the transaction, and such instruments may also serve to identify the customer as a participant in the loyalty program.

In some embodiments, the applicable loyalty program may involve distinct merchants, so that points accumulated within the loyalty program for transactions at a first merchant may be used towards a reward from a second merchant. The different merchants may value the point total differently so that point-settlement functions among the merchants may also be provided. In addition, reporting functions may be performed to provide summary information to any of the parties involved with the loyalty system.

The methods of the present invention may be embodied in a computer-readable storage medium having a computer-readable program embodied therein for directing operation of a computer system. Such a computer system may include a communications system, a processor, and a storage device. The computer-readable program includes instructions for operating the computer system to operate loyalty programs in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. Overview

Figure 1A:
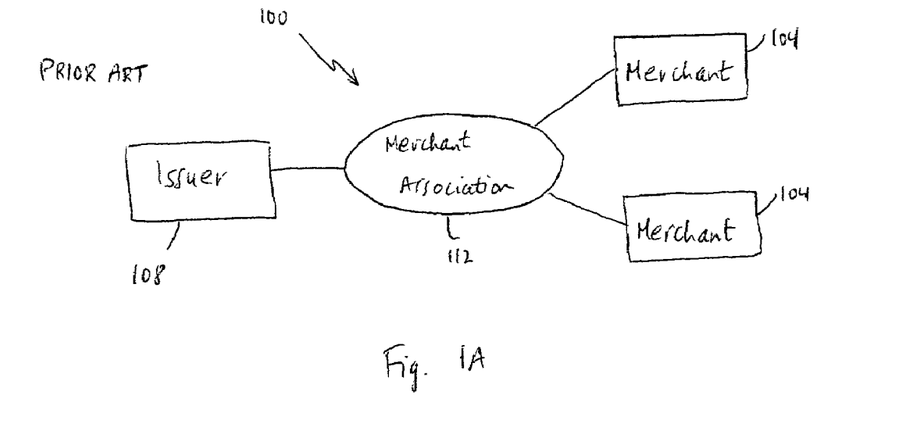
FIGS. 1A and 1B provide schematic illustrations of the organization of prior-art loyalty systems.

Various loyalty systems may involve a variety of different entities. A simple example of a traditional prior-art loyalty system is shown in FIG. 1A. In this illustration, the loyalty system 100 operates for a plurality of merchants 104 related by a merchant association 112. A single issuer 108 provides an instrument that may be used to identify individual customers and their participation within the loyalty system 100. For example, the merchant association 112 may simply be a commercial retail entity, such as "Store X" and merchants 104 may be retail outlets for that entity. The identification instrument issued by the issuer 108 may be a loyalty card that identifies the commercial entity. A customer may then present her card when she makes purchases at any retail outlet of Store X and accumulate points. Such points may be redeemed for merchandise from a catalog at some later date when certain point-total levels are reached.

Figure 1B:
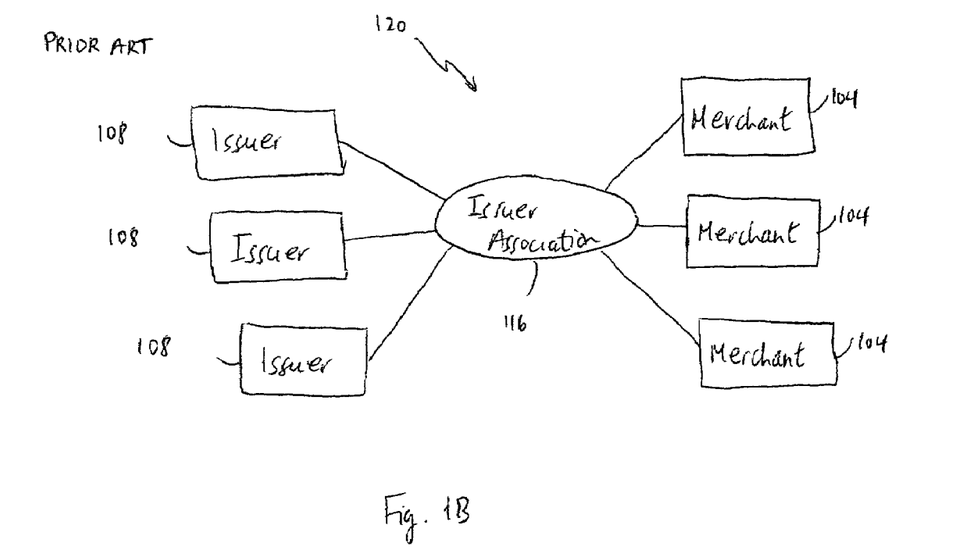

FIG. 1B illustrates a slightly more sophisticated loyalty system 120 that uses an issuer association 116 so that multiple issuers may participate in the system. A plurality of merchants 104 and a plurality of issuers 108 interact separately with the issuer association in administering the loyalty program. For example, the issuer association 116 may be a credit organization that interacts with a plurality of banks in providing credit to customers. A customer having an instrument, such as a credit card, issued by any of the banks and bearing the credit organization's logo may accumulate loyalty points whenever he uses the card. The card may be used to obtain credit for purchases at any of the participating merchants. Upon reaching certain point totals, the customer may redeem the points for goods or services from organizations having a suitable arrangement with the issuer association 116 and/or individual issuers 108.

The loyalty systems illustrated in FIGS. 1A and 1B remain constrained in their operation by the limited scope of relationships among specific merchants and issuers. One embodiment of the invention that provides significantly greater scope is shown schematically in FIG. 1C. The embodiment of FIG. 1C uses an aggregator 118 that acts as an intermediary between an issuer association 116 and a plurality of merchants 104. The aggregator 118 may also act as a direct intermediary between issuers 108 and merchants 104, in which case it functions in a manner similar to the issuer association 116 shown in FIG. 1B.

The increased versatility of loyalty programs that may be administered with this system 140 exploit the existence of multiple, and sometimes competing, issuer associations 116. For example, any instrument associated with an issuer association that also bears an identification of the aggregator 118 may be used to participate in a loyalty program. In some instances, the loyalty program will be for a single retail organization, but may in other instances span across multiple organizations. A variety of examples of loyalty programs that may be administered with the structure of FIG. 1C are discussed below.

Figure 1C:
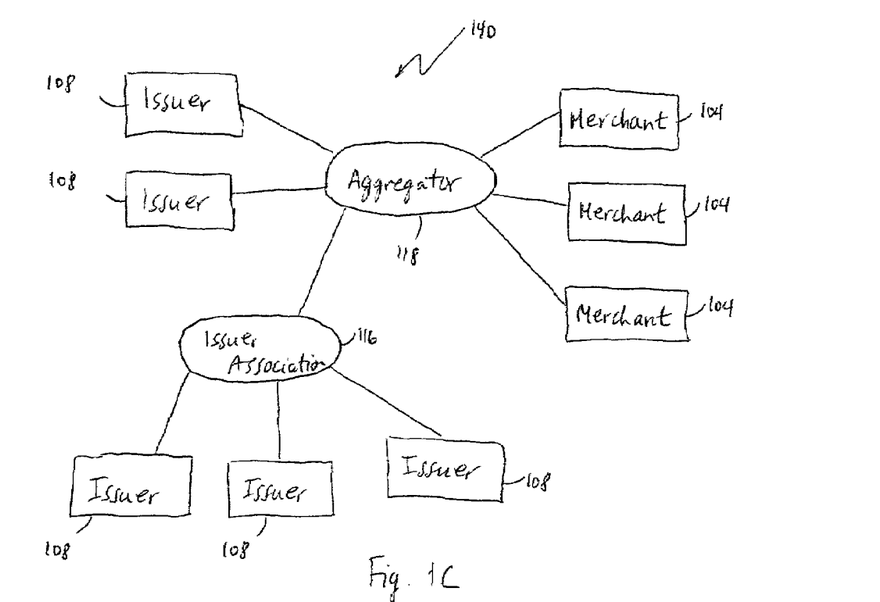
FIGS. 1C and 1D provide schematic illustrations of the organization of loyalty systems in accordance with embodiments of the invention.

The basic structure of FIG. 1C may be extended in further embodiments to encompass multiple aggregators 118. In the embodiment shown in FIG. 1D, the loyalty system 160 includes a plurality of aggregators 118, each of which interacts with at least one issuer association 116 and perhaps also directly with one or more issuers 108. A plurality of merchants 104 interact with the aggregators 118; each individual merchant within the system may interact with one or more of the aggregators. Accordingly, a particular merchant may permit any customer having an instrument identifying its associated aggregators to participate in a loyalty program. Further, that merchant may permit any customer having an instrument identifying any issuer associations 116 associated with those aggregators 118, or even any issuers 108 associated with those issuer associations 116 or aggregators 118, to participate. This arrangement thus provides an enhanced degree of versatility in the administration of loyalty programs.

Figure 1D:
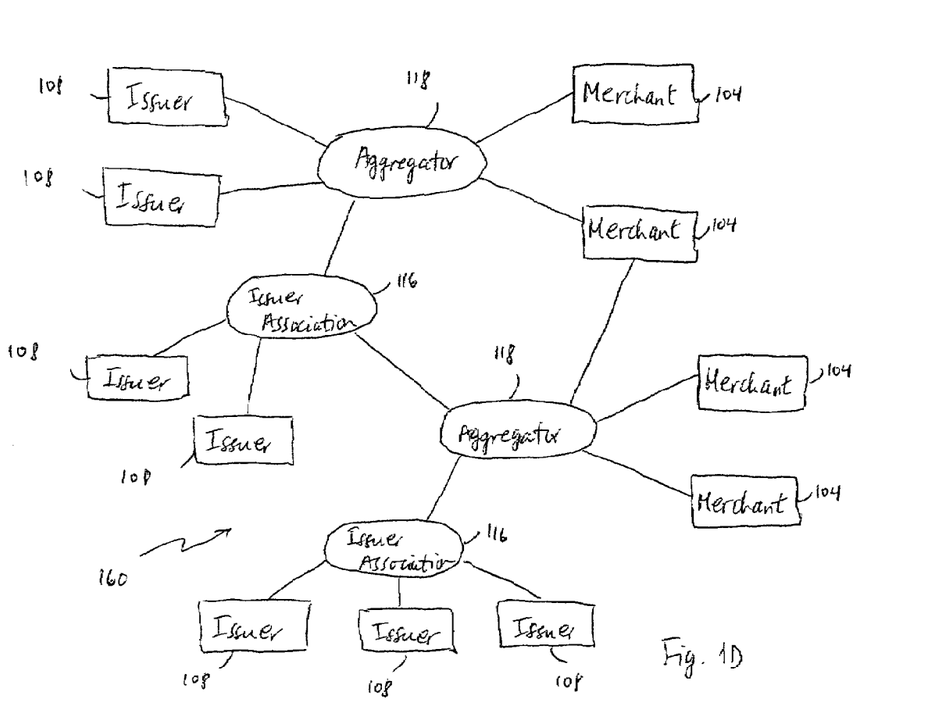

While FIGS. 1C and 1D show those merchants and issuers who participate in some aspect of a loyalty system, more generally there will also exist merchants and issuers who do not participate in the loyalty system. Such nonparticipating merchants and issuers may nevertheless wish to share in a financial infrastructure for processing transactions with the participating merchants and issuers. Such a financial infrastructure provides a general interconnection among merchants and issuers that permits credit, debit, check, stored-value, and other types of transactions to be executed. The infrastructure functions generally by permitting a merchant to transmit details of a transaction to a central authority, which then ensures that any necessary authorization from an issuer (or issuer association) is obtained so that the transaction may be approved.

2. Integration of Loyalty System with Financial Infrastructure

Figure 2:
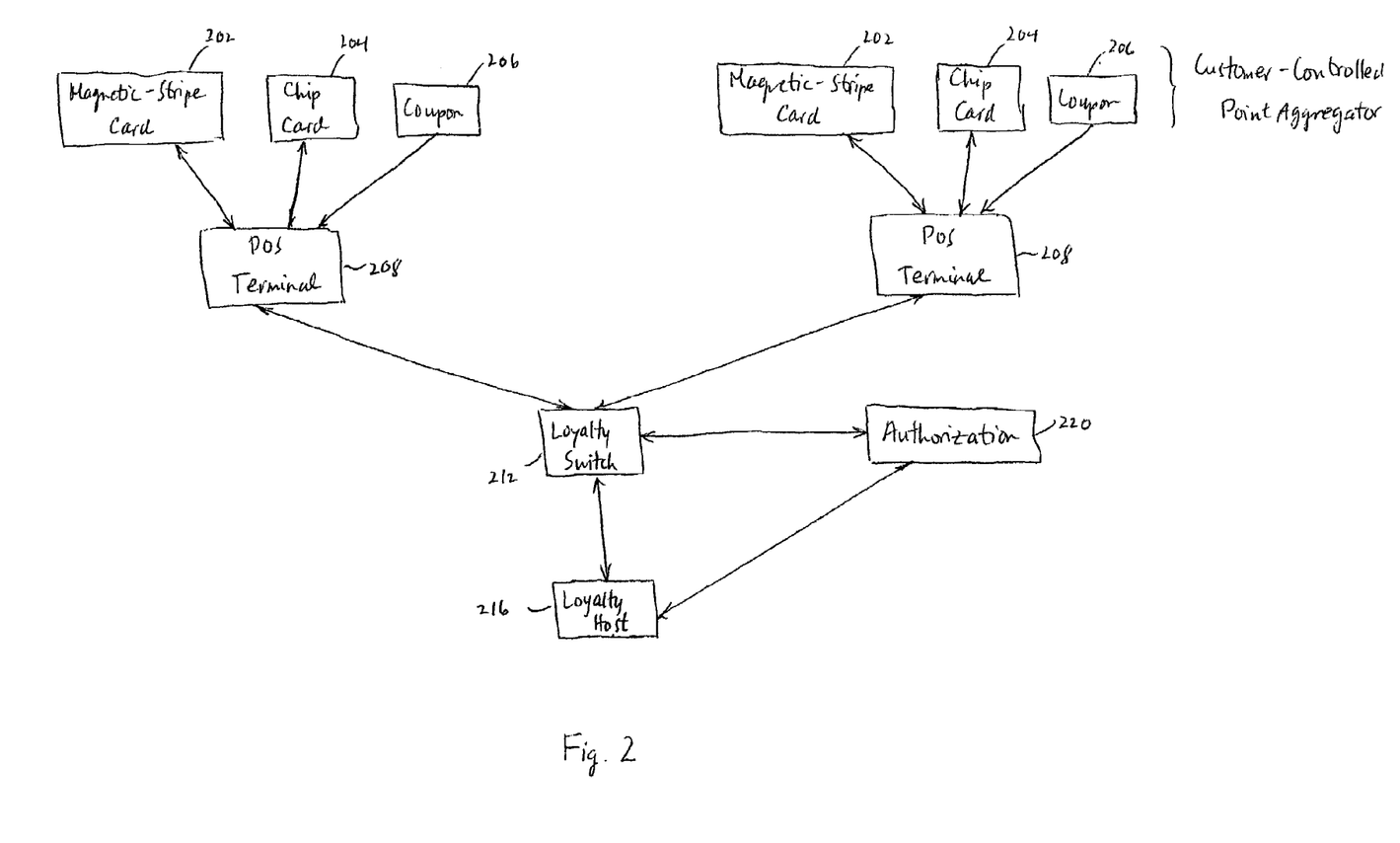
FIG. 2 provides a schematic illustration of how loyalty-program information is routed according to embodiments of the invention.

FIG. 2 provides a schematic overview of how a loyalty system structured in accordance with the embodiments of FIGS. 1C or 1D may be integrated with such a financial infrastructure. Each of a plurality of point-of-sale terminals 208 is connected with a loyalty switch 212. The set of point-of-sale terminals 208 may be widely distributed geographically and associated with a variety of different merchants and organizations, including different retail outlets, service outlets, etc. Each point-of-sale terminal 208 may be configured to accept one or more different types of payment options, including a magnetic-stripe card 202 such as a credit or debit card, a chip card 204 such as a smart card, and a coupon 206. Accordingly, customers may individually control the instrument used for participation in loyalty programs and may use different aggregator instruments at different times if desired. An example of a point-of-sale system that may accommodate multiple types of payment options is described in copending, commonly assigned U.S. patent application Ser. No. 09/634,901, entitled "POINT OF SALE PAYMENT SYSTEM," filed Aug. 9, 2000 by Randy J. Templeton et al., which is a non-provisional of U.S. Prov. Appl. No. 60/147,899, entitled "INTEGRATED POINT OF SALE DEVICE," filed Aug. 9, 1999 by Randy Templeton et al., the entire disclosures of both of which are herein incorporated by reference for all purposes.

When a transaction is executed using a point-of-sale terminal 208, an electronic packet identifying the terms of the transaction and including an identification of the payment instrument is forwarded to the loyalty switch 212, which makes a determination whether the merchant and customer who are parties to the transaction are registered within the loyalty system. Such a comparison is performed by comparing the identification of the parties included within the electronic packet with a database listing of registered participants. If either party is not registered, the loyalty switch 212 only forwards the electronic packet to an appropriate authorization authority 220 through communication networks comprised by the financial infrastructure. This authority 220 will generally comprise an issuer 108, but may comprise an issuer association 116 according to different embodiments. The authority 220 determines whether to authorize the transaction in accordance with its own standards and communicates its decision back through the financial infrastructure and the loyalty switch 212 to the originating point-of-sale terminal 208.

If the parties to the transaction are registered, indicating that the customer is participating in one or more forms of loyalty programs integrated with the financial infrastructure, the loyalty switch forwards the electronic packet through the financial infrastructure to a loyalty host 216. The loyalty host 216 will generally be comprised by an aggregator 118 configured within the financial architecture as illustrated in FIGS. 1C or 1D, and operates remotely as an administration authority. The loyalty host 216 stores administration criteria for the loyalty programs, which together may form part of a more comprehensive loyalty system. These administration criteria may be applied in accordance with a variety of different schemes for such a loyalty system, some of which are described below. Various advantages, including increased flexibility of administration, result from the remote character of the loyalty host 216 and in some embodiments permit greater integration of loyalty programs within the loyalty system.

The loyalty switch 212 may be configured also to forward the electronic packet to the authorization authority 220 to approve the transaction, although in some embodiments that function will be performed by the loyalty host 216 to ensure that loyalty credit is given only if the transaction is properly authorized and satisfactorily executed.

Figure 3:
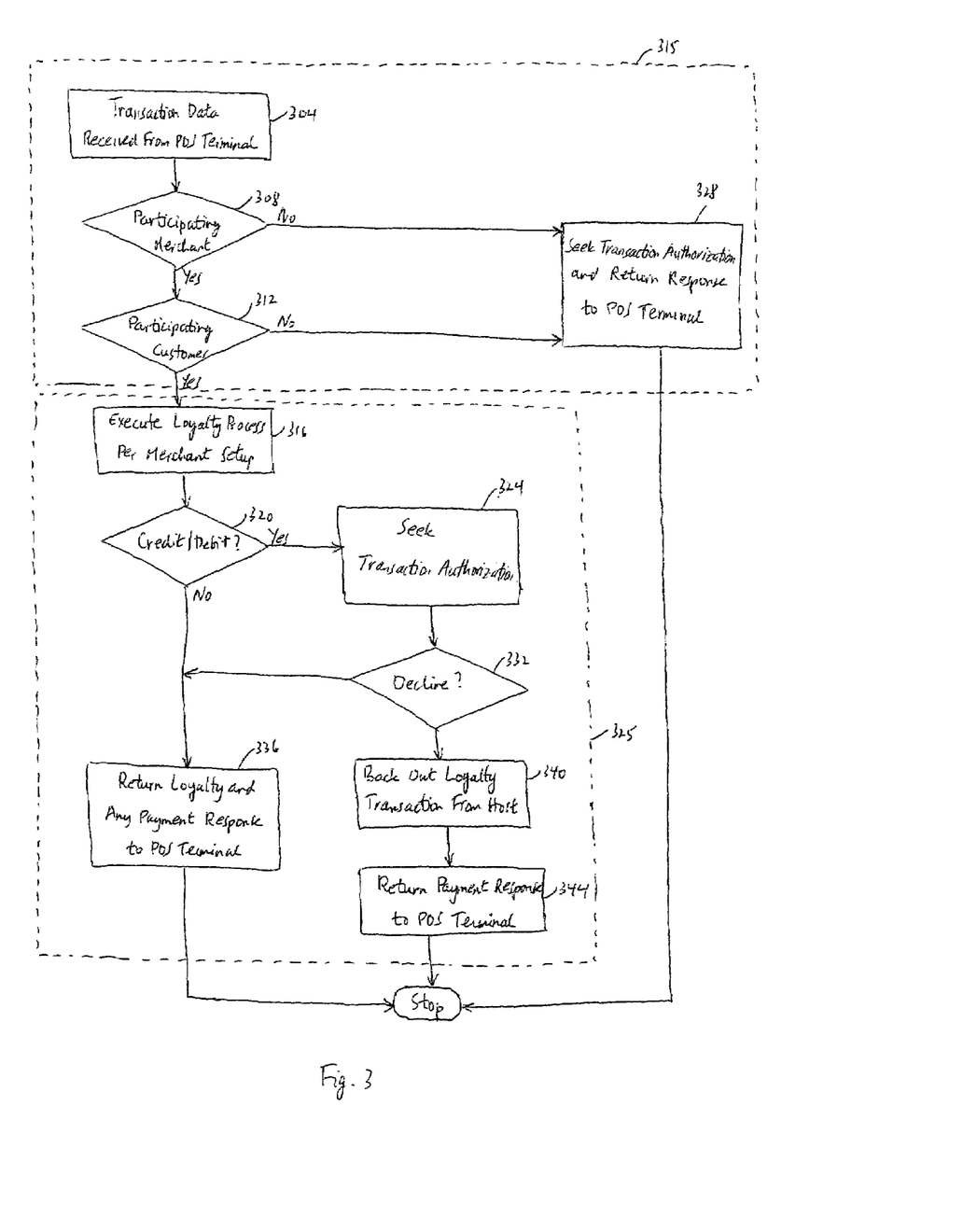
FIG. 3 provides a flow diagram illustrating the operation of the loyalty host in accordance with embodiments of the invention.

The coordinated operation of the loyalty switch 212, loyalty host 216, and authorization authority 220 with respect to a transaction is illustrated with the flow diagram of FIG. 3 for one embodiment. Those functions performed by the loyalty switch 212 are denoted generally by block 315 and those functions performed by the loyalty host 216 are denoted generally by block 325. At block 304, transaction data are received from the point-of-sale terminal 208 as an electronic packet by the loyalty switch 212. The loyalty switch 212 compares the identity of the merchant at block 308 and the identity of the customer at block 312 with a database identifying all participating merchants and customers. If either the customer or the merchant is not a participant in the loyalty program, authority for the transaction is sought at block 328. The response is communicated back to the point-of-sale terminal 208 where the transaction is executed or declined in accordance with the authorization response.

If both the customer and merchant participate in any loyalty program operated by the loyalty system, the appropriate loyalty process is executed at block 316 in accordance with the arrangements for that particular merchant and/or that particular customer. Such execution may include making a decision to provide a reward to the customer immediately at the point of sale. A determination is made at block 320 whether the transaction requires authorization from an authorization authority 220. Examples of transaction types that require authorization include credit and debit transactions; examples of transaction types that do not require authorization include use of a stored-value card or coupon, and payment by cash with presentment of a dedicated loyalty card. If necessary, authorization for the transaction is sought at block 324 and an evaluation of the response is made at 332. If the transaction is declined, the loyalty transaction is backed out at block 340 and the payment response is returned to the point-of-sale terminal 208 at block 344.

In this arrangement, execution of the loyalty process is generally initiated before authorization for the transaction is received. This is preferred primarily for reasons of efficiency so that the transaction authorization may be sought at the same time as the loyalty process is being executed. It is expected that a large majority of transactions will be authorized so that the need to back out of the loyalty transaction will be exceptional. In an alternative embodiment, authorization may be sought before initiating the loyalty process. This has the advantage of avoiding the need to back out of a transaction at block 340, but is expected to be less efficient overall.

At block 336, whether reached through the flow diagram because no authorization is needed for the transaction or because the transaction was authorized, a response is returned to the point-of-sale terminal 208. This response includes the loyalty characteristics, such as a change in points or the availability of an award, as well as an indication that the transaction has been authorized.

The loyalty host 216 may be configured in a variety of different ways to effect the functions described with respect to FIGS. 2 and 3. In one embodiment, a computer system is used, one example of which is shown schematically in FIG. 4A. This figure broadly illustrates how individual system elements for the loyalty host 216 may be implemented in a separated or more integrated manner. The loyalty host 216 is shown comprised of hardware elements that are electrically coupled via bus 408, including a processor 401, one or more input devices 402, one or more output devices 403, one or more storage devices 404, a computer-readable storage media reader 405a, a communications system 406, a processing acceleration unit 407 such as a DSP or special-purpose processor, and a memory 409. The computer-readable storage media reader 405a is further connected to a computer-readable storage medium 405b, the combination comprehensively representing remote, local, fixed, and/or removable storage devices plus storage media for temporarily and/or more permanently containing computer-readable information.

Figure 4A:
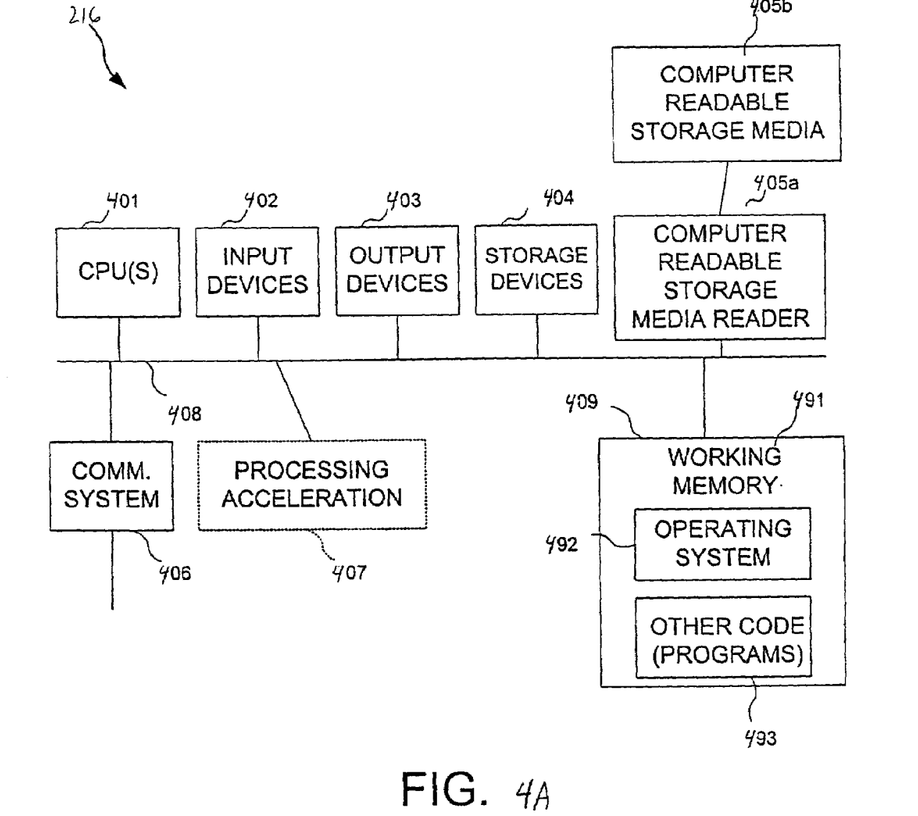
FIG. 4A provides a schematic illustration of a computer system that may be configured to perform functions of the loyalty host in accordance with embodiments of the invention.

The database information regarding merchants, issuers, and/or individual customers is generally stored on the storage devices 404. The database information stored on the storage devices 404 is sometimes referred to herein as defining a "central database," although there is no requirement that such a central database be stored on any single storage device. For example, the central database may comprise a distributed database by being stored across multiple storage devices 404. A central database excludes, however, the storage of database information only on instruments local with individual customers and/or merchants. For example, in embodiments where transactions are initiated with chip cards that identify the customers that hold them, the use of a central database permits customer records to be stored remotely from the individual chip cards.

The communications system 406 is configured to effect communications as needed with merchants and issuers. It thus receives the electronic packet from the point-of-sale device 208 and transmits any loyalty or payment authorizations as needed back to the point-of-sale device 208. In addition to providing such infrastructure communications links internal to the system, the communications system 406 may also provide a connection to other networks such as the internet and may comprise a wired, wireless, modem, and/or other type of interfacing connection. Such additional connections may be useful for support functions that may be assisted by the loyalty host 216 described below and provided for merchants, issuers, and customers.

The loyalty host 216 also comprises software elements, shown as being currently located within working memory 491, including an operating system 492 and other code 493, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 4B:
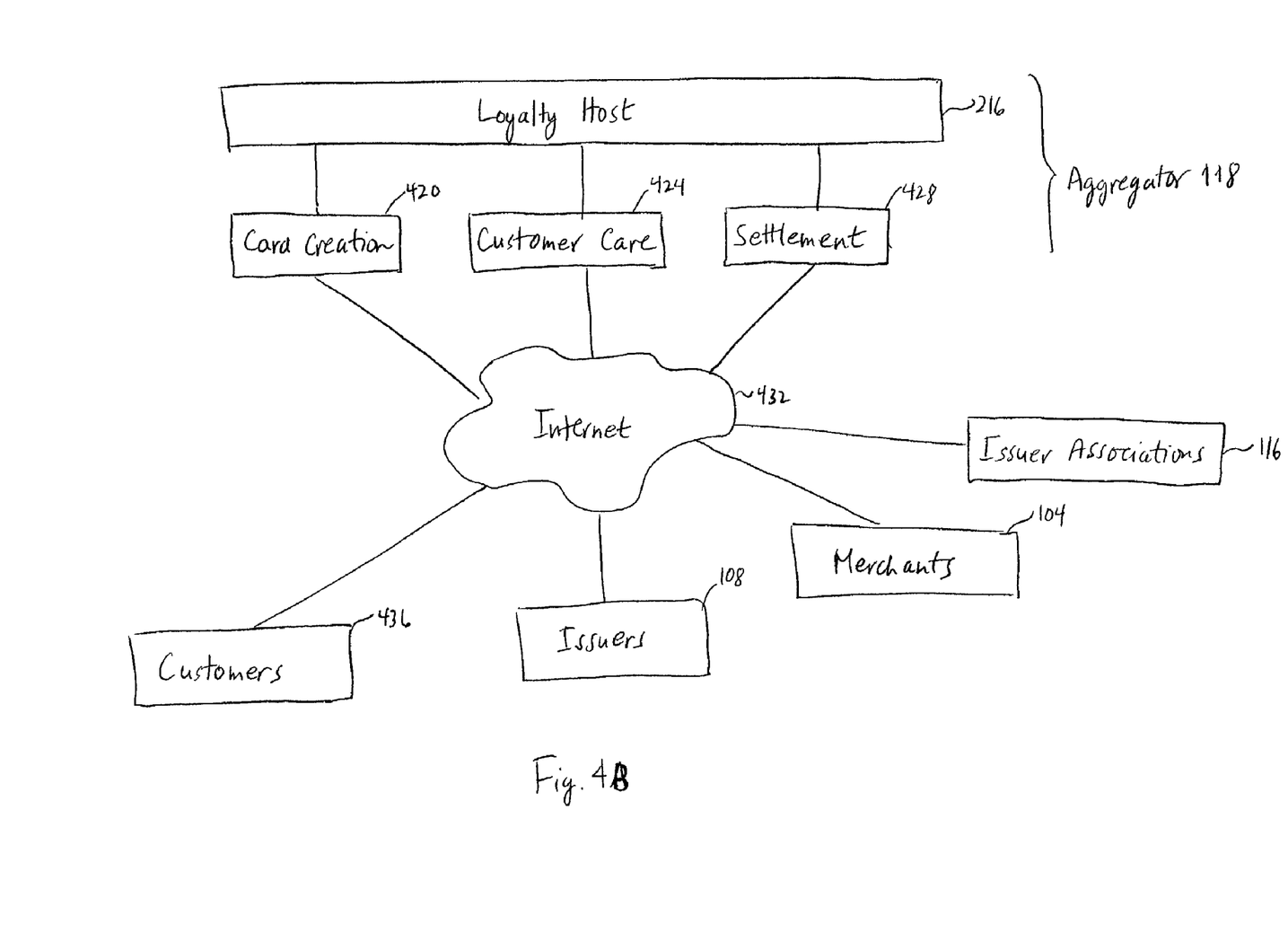
FIG. 4B provides a schematic illustration using an internet connection for access to the loyalty host.

FIG. 4B provides a schematic illustration of one embodiment in which the loyalty host 216 is connected with the internet 432 to provide support services to merchants 104, issuers 108, issuer associations 116, and/or customers 436. In addition to managing transactions eligible for loyalty credit, the loyalty host 216 may be configured to assist in supplementary service functions able to exploit the fact that the loyalty host 216 is equipped to maintain database information for the participating merchants 104, issuers 108, issuer associations 116, and/or customers. Accommodation of such support services over an internet connection is in addition to the use of infrastructure connections described with respect to FIG. 3 and intended for services that are not as time critical as the loyalty process and authorization decisions needed at the time of a transaction.

FIG. 4B shows three examples of support services that may be configured in this way, although it will be appreciated that additional support services may be similarly provided. Specific elements of the aggregator 118 are configured in communication with the loyalty host 216, examples of which include a card creation element 420, a customer care element 424, and a settlement element 428. Such elements may be provided as functions comprised by the loyalty host 216 or may be provided as functions operating separately but with access to the loyalty host 216. Each of the support service elements includes a communication with the internet 432 so that their functions may be accessed as necessary or desirable by merchants 104, issuers 108, issuer aggregators 116, and/or customers.

3. Loyalty Programs

The systems described above are suitable for accommodating a large variety of different types of loyalty programs. Individual programs may be specific to an individual store or organization or may span across multiple otherwise unrelated organizations as part of a more comprehensive loyalty system. In one aspect, individual customers may participate in multiple loyalty programs that are managed as independent programs by the aggregator 118. Points maintained for the different programs are identified and distinguished by different point types. In this way, the customer may be able to use a single instrument identified with the aggregator's logo for participation in all her loyalty programs.

For each of the loyalty programs, rewards may be accumulated in at least three ways. First, rewards may be based on recency criteria, in which a reward is triggered either by completing a transaction within a specified time interval or by completing a specified number of transactions within a given time interval. Second, rewards may be based on frequency, in which a reward is triggered by completing a specified number of transactions. Third, rewards may be monetarily based so that a reward is triggered when a specified total transaction amount is reached. Such triggers may be specified for individual transactions or may be specified for accumulated transaction amounts over multiple transactions.

In addition, reward triggers may be conditional. Examples of conditional triggers include a requirement that points be accumulated only for transaction above a certain amount, and perhaps that points be accumulated more generally at different rates for transactions of different sizes. Other conditional triggers may be associated with time constraints so that points may only be accumulated only after a specified date, only before a specified date, only an certain days of the week, only during certain holiday periods, etc. Accumulation of points may also be conditionally restricted to certain tender types and to transactions where no reward is applied.

Accumulation of rewards is generally tracked in terms of points. Such points will generally be correlated with aspects of a transaction, and may be set to expire after a certain time period or at a predetermined time. Thus, for a recency loyalty system, points will generally be set to expire within the time period required for completion of the transactions. For a frequency loyalty system, points will usually be integers corresponding to the number of transactions completed. For a monetary loyalty system, points will be correlated with the dollar amount of the transaction. The correlation rates may differ for different issuers, even within the same loyalty program, requiring use of the settlement functions described below. Points may generally be structured to expire periodically or after a specified period of inactivity to prevent excess accumulation by individual customers. Furthermore, point totals for individuals may be conditioned to reset when awards are given, to reset on a cyclical basis (e.g., monthly or annually), to continue to accumulate (rewards given for different levels reached), or to be permanently eliminated upon issuance of a reward (such as for a one-time reward).

In certain embodiments, points may be accumulated collectively by multiple customers. For example, each member of a family may have a separate card that identifies them individually, but points are accumulated into an account for the family as a whole. In other embodiments, points may be transferred among customers.

The manner in which such loyalty programs function may be illustrated with specific examples. First, consider a loyalty program in which points are given for every dollar spent at any of a plurality of stores having diverse retail practices, such as a clothing chain, a hardware chain, and a restaurant chain. A customer who uses a card bearing a logo for the aggregator that manages this program accumulates points at any of the stores and may exchange the accumulated points for goods at any of the stores. For example, the customer may make a series of purchases at the hardware chain over a period of time and may subsequently redeem the points for dinner at a restaurant that forms part of the restaurant chain. This is an example of a purely monetary loyalty program that operates by the individual chains determining how to allocate point values among themselves to accommodate their respective benefits of participating in the program. This is also an example where different money-point correlation rates may be appropriate to account for differences in retail practices among the merchants.

As another example, consider a loyalty program in which a pizza chain and a video-rental chain cooperate. They advertise collectively that anyone who buys three pizzas at the pizza chain may receive a free video rental at the video-rental chain and anyone who rents fifteen videos at the video-rental chain is entitled to a free pizza at the pizza chain. Customers having cards bearing the aggregator logo have their purchases of pizzas and rentals of videos recorded so that the reward may be issued when the criteria have been fulfilled. Such rewards may be given automatically at the point of sale when the customer uses his card. This is an example of a frequency-based reward system that uses the aggregator to integrate separate organizations into the plan in a cooperative way.

As a further example, consider a loyalty program in which a movie-theater chain, a bookstore chain, and a music-store chain that are otherwise independent from one another cooperate. They offer a program in which, in any monthly period, a $25.00 purchase at each of two of the chains entitles the customer to a $5.00 rebate towards a purchase at the third chain. The purchases of customers having cards bearing the aggregator logo are recorded whenever they visit any of the three chains and issue the appropriate reward when the conditions are met. This example combines aspects of recency-based and monetary-based loyalty systems that use the aggregator to permit separate organizations to cooperate to their mutual benefit.

4. Support Functions

Figure 5A:
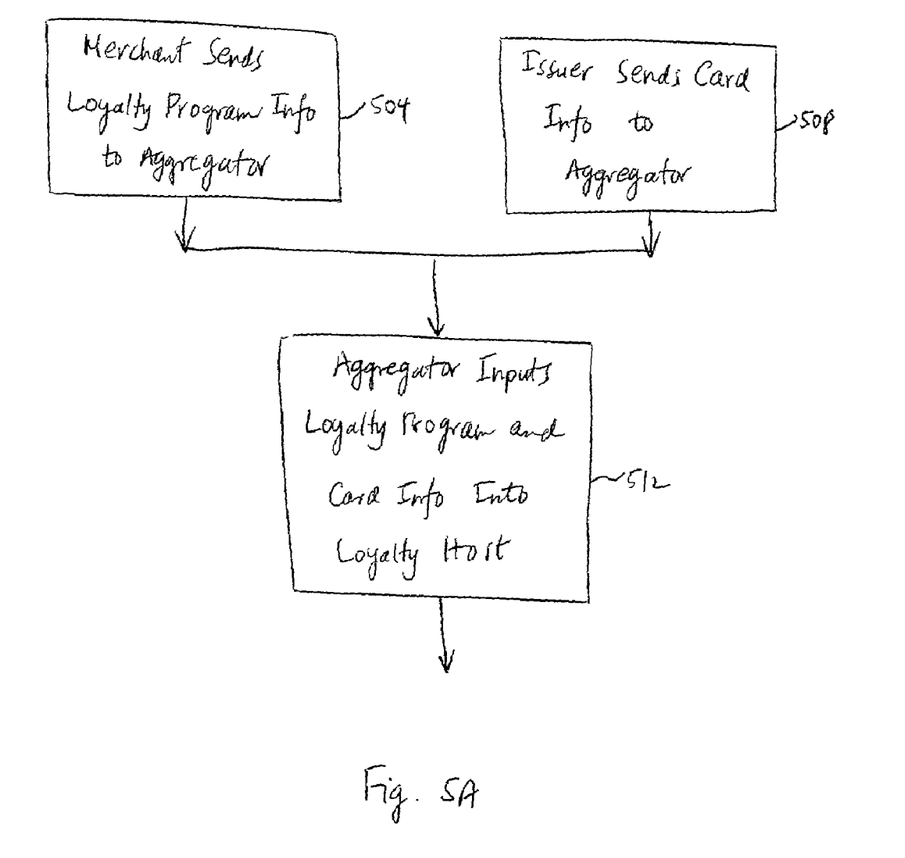
FIGS. 5A-5D provide flow diagrams illustrating support functions that may be aided by connection with the loyalty host.

FIGS. 5A-5D provide illustrative examples of support functions that may be performed by the loyalty host. For example, FIG. 5A is a flow diagram illustrating card-creation functions that may be aided by interaction with the loyalty host 216. At block 504, one or more merchants 104 who wish to provide a loyalty program such as those described above to its customers transmits information describing the loyalty program to the aggregator 118. Such a loyalty program may be specific to a given store, may apply more broadly to all stores for a given organization, or may even span across multiple merchants and organizations. At block 508, the issuer 108 transmits card information to the aggregator 118. Such information will generally be sufficient to identify a customer 436 who participates in the loyalty program from whatever instrument has been designated to act as point aggregator for the program. In some embodiments, the information includes a password issued to the customer 436 for use by the customer in accessing other support functions described below. At block 512, the information received from both the merchant(s) 104 and the issuer 108 is stored on the storage device(s) 404 of the loyalty host 216. This permits later accessing of the information in administering the loyalty program.

Figure 5B:
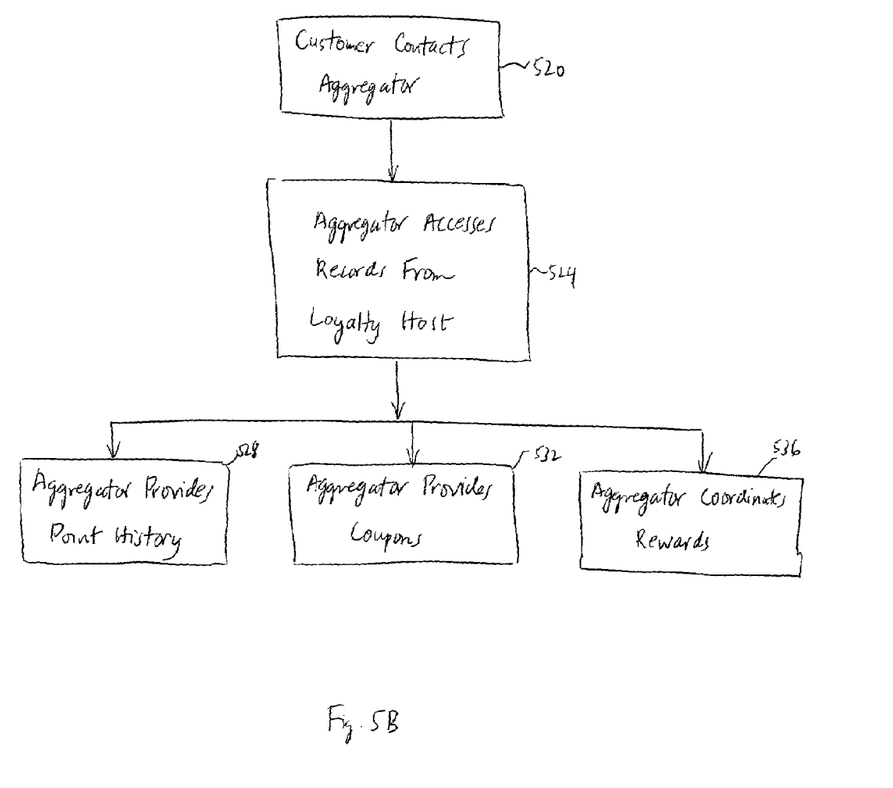

FIG. 5B is a flow diagram illustrating certain customer-care functions that may be aided by interaction with the loyalty host 216. At block 520, a customer 436 contacts the aggregator 118. This may occur in a variety of fashions as determined by the customer 436, including through the internet, by telephone, by fax, or by mail. Internet contact will usually be accompanied by a greeting interface in which the customer 436 identifies himself by supplying his password. Upon providing suitable identification verification, a menu is displayed to permit the customer 436 to select desired customer-care functions. Similarly, telephone contact will generally use an automated menu system in which the customer 436 will be asked to supply his password to verify his identity and to select desired functions, although an option will generally be available to speak directly with a customer service representative. Mail and fax communications will typically be handled by customer service representatives, and will usually not supply as fast a response as internet or telephone communications.

At block 524, the aggregator 118 accesses records from the storage device(s) 404 of the loyalty host 216 as necessary to respond to a request from the customer 436. Three examples of the types of request are shown in the figure, although many other types of customer care services may also be provided with the information stored by the loyalty host 216. For example, at block 528, the aggregator 118 may access the storage device(s) 404 to provide an activity summary for the customer 436, including such information as total number and type of loyalty points, when those points were acquired, and the number needed to reach certain target levels for awards.

At block 532, the aggregator 118 may access the storage device(s) 404 to provide rewards for a customer 436 who has accumulated the requisite number of loyalty points. Such activity comprises verifying the number and type of accumulated loyalty points for a particular customer and performing a comparison with the requirements of the loyalty program. In one embodiment, one or more coupons, such as electronic coupons over the internet, may be provided to the customer 436 as the reward.

The activity denoted at block 536 is similar, but the reward is coordinated by the aggregator 118 instead of being provided in the form of a coupon. For example, with a loyalty program that permits the customer to redeem points for rewards with different types of merchants, the aggregator 118 may record a reward selection for that merchant and arrange for it to be automatically redeemed when the customer next visits the merchant. More specifically, suppose a loyalty program permits, and a customer chooses, to redeem points for 10% off any purchase at Store X. The aggregator 118 accepts the selection of the customer 436 to choose such a reward and records that choice in the storage device(s) 404. The next time the customer visits Store X, the record of his reward selection is applied by the loyalty host 116 at block 336 of FIG. 3 so that 10% is automatically deducted by the point-of-sale device upon presentation of his identification instrument.

Figure 5C:
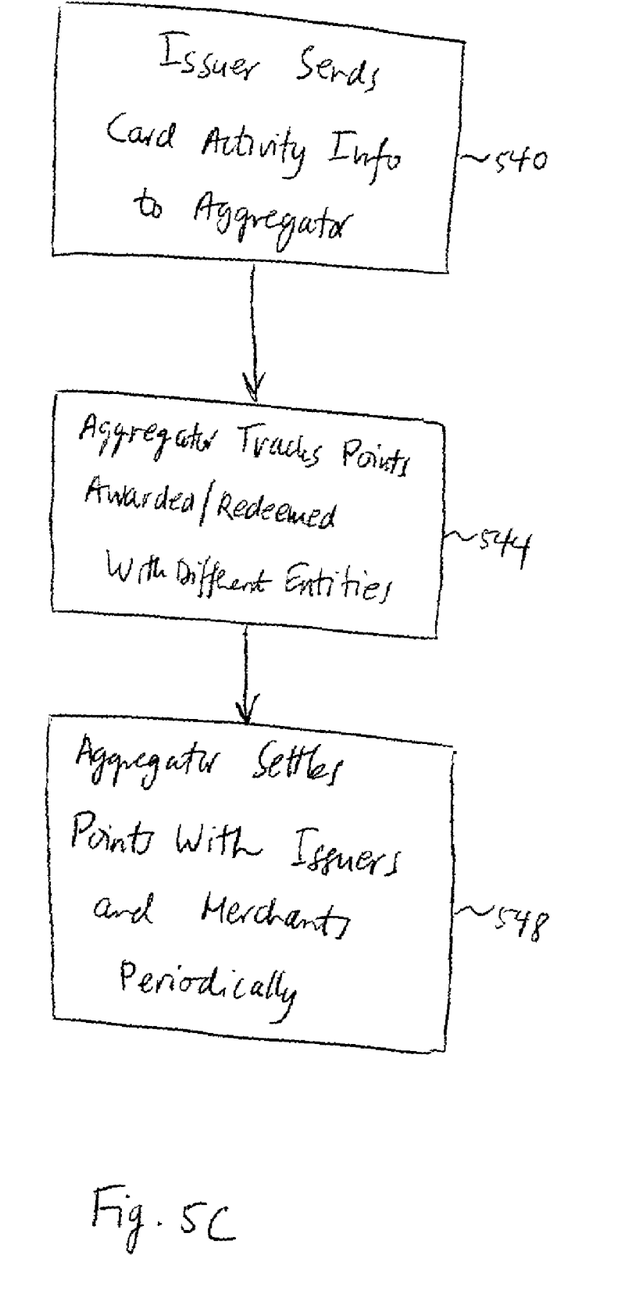

FIG. 5C is a flow diagram illustrating one embodiment in which settlement functions are aided by the loyalty host 216. The settlement system is particularly well suited for embodiments in which different merchants and organizations participate in a common loyalty system. The settlement system permits settling the respective value of points issued or redeemed between various parties to the loyalty system, some of which assign different correlation rates for the point values. Thus, at block 540, the issuer 108 sends card-activity information to the aggregator 118 and the aggregator 118 tracks points as they are issued or redeemed within the system at block 544. The aggregator 118 periodically settles the points with the issuers 108 and merchants 104, thereby acting as an independent auditor of their participation in the loyalty system. Such settlement functions are typically performed at a time when the loyalty host 216 is least likely to be occupied handling transactions, such as during early morning hours.

Figure 5D:
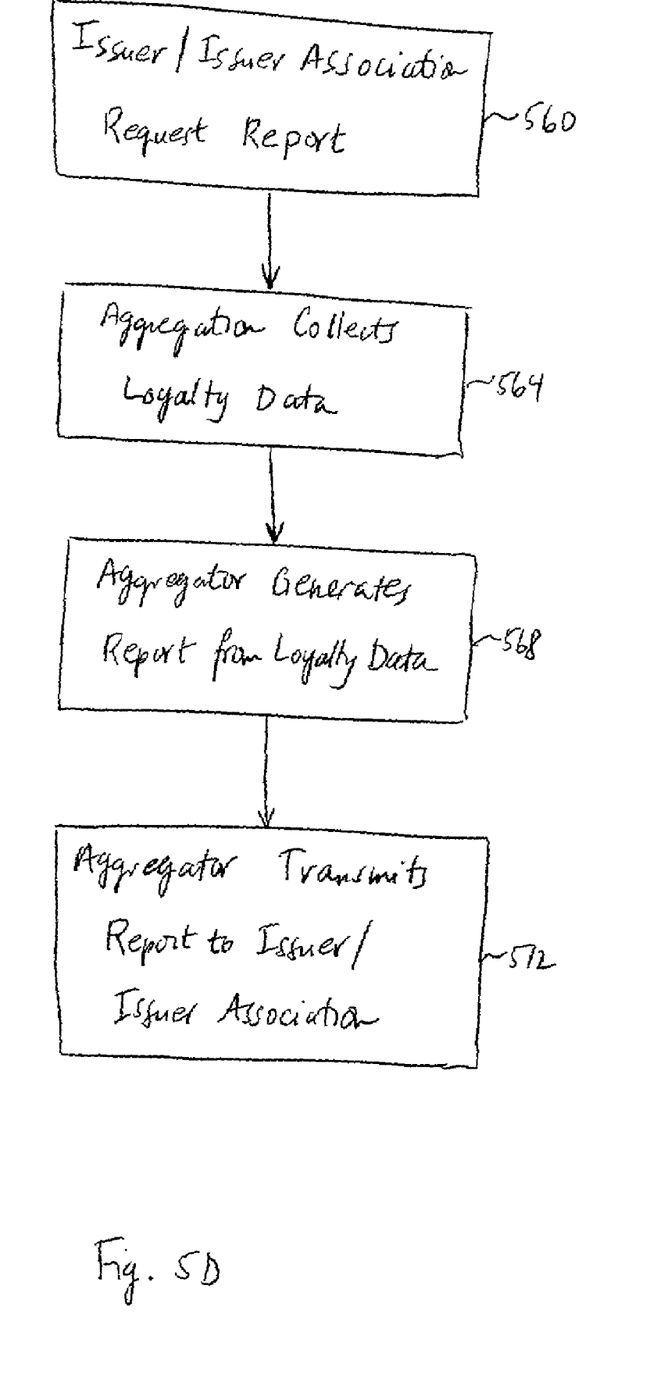

In addition to such functions, it is also desirable for the loyalty host 216 to perform reporting functions. The flow diagram of FIG. 5D illustrates one embodiment in which such reporting functions are included. At block 560, the issuer 108 or issuer association 116 initiates the creation of a report by sending a request for a report to the aggregator 118. In alternative embodiments, report requests may be initiated automatically on a periodic basis such as daily, weekly, or monthly. Loyalty data to be used in generating the report is collected by the aggregator at block 564, and the report is generated at block 568.

Various types of reports may be generated depending on the type of information desired. For example, in one embodiment, an audit report is generated to describe all activity that occurs on a daily basis, include points-issuance transactions and points-redemption transactions. For each transaction, the report may include an identifier for the consumer involved in the transaction, a transaction date, the amount of the transaction, an identifier for the merchant and location where the transaction was executed, an identifier for the specific point-of-sale terminal used in the transaction, and an identification of the type of transaction. In another embodiment, the report may comprise a settlement report that indicates how points have been settled in accordance with the settlement functions described above. In a further embodiment, the report may comprise a liability report that indicates the extent to which an issuer 108 has outstanding liability of pending points for redemption. Such a liability report typically includes a daily and monthly total report classifying the number of outstanding points by customer. Such reporting features are useful for participants in the loyalty programs to monitor their success quantitatively.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for operating a loyalty program integrated with a financial infrastructure, the method comprising:
   receiving, at a loyalty host system, a transaction instruction initiated by a customer at a merchant point-of-sale device disposed at a merchant point of sale;
   determining, with the loyalty host system, whether the customer and merchant are participants in the loyalty program;
   executing, with the loyalty host system, a loyalty process in accordance with the loyalty program if the customer and merchant are participants, wherein the loyalty process includes augmenting a stored point total for the customer by an augmentation amount in accordance with the application of administration criteria to the transaction instruction;
   transmitting, with the loyalty host system, the transaction instruction to the financial infrastructure with a request for approval of the transaction instruction;
   receiving, with the loyalty host system, a denial of the transaction instruction from the financial infrastructure;
   backing out of the loyalty process, with the loyalty host system, by decrementing the stored point total for the customer by the augmentation amount after receiving the denial of the transaction instruction; and
   transmitting, with the loyalty host system, the denial of the transaction instruction to the merchant point-of-sale device.

2. The method recited in claim 1 wherein executing the loyalty process comprises transmitting an instruction to the merchant to provide a reward to the customer immediately at the point of sale in accordance with the loyalty program.

3. A computer-readable storage medium having a computer-readable program embodied therein for directing operation of a computer system including a communications system, a processor, and a storage device, wherein the computer-readable program includes instructions for operating the computer system for operating a loyalty program integrated with a financial infrastructure in accordance with the following:
   receiving, over the communications system, a transaction instruction initiated by a customer at a merchant point-of-sale device disposed at a merchant point of sale;
   determining whether the customer and merchant are participants in the loyalty program from data stored on the storage device;
   executing a loyalty process with the processor in accordance with the loyalty program if the customer and merchant are participants, wherein the loyalty process includes augmenting a stored point total for the customer by an augmentation amount in accordance with the application of administration criteria to the transaction instruction;
   transmitting, over the communications system, the transaction instruction to the financial infrastructure with a request for approval of the transaction instruction;
   receiving, over the communications system, a denial of the transaction instruction from the financial infrastructure;
   backing out of the loyalty process by decrementing the stored point total for the customer by the augmentation amount after receiving the denial of the transaction instruction; and
   transmitting, over the communications system, the denial of the transaction instruction to the merchant point-of-sale device.

4. The computer-readable storage medium recited in claim 3 wherein executing the loyalty process comprises transmitting an instruction over the communications system to the merchant to provide a reward to the customer immediately at the point of sale in accordance with the loyalty program.

* * * * *

UNITED STATES PATENT AND TRADEMARK OFFICE
CERTIFICATE OF CORRECTION

PATENT NO. : 7,620,567 B2  Page 1 of 1
APPLICATION NO. : 10/079927
DATED : November 17, 2009
INVENTOR(S) : George et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2291 days.

Signed and Sealed this

Twenty-sixth Day of October, 2010

David J. Kappos
*Director of the United States Patent and Trademark Office*